United States Patent [19]

Tankred et al.

[11] 4,189,984

[45] Feb. 26, 1980

[54] PISTON-CYLINDER ARRANGEMENT FOR A COMPRESSOR

[75] Inventors: Hans J. Tankred, Sonderborg; Erling B. Kristensen, Austenborg, both of Denmark

[73] Assignee: Danfoss A/S, Nordborg, Denmark

[21] Appl. No.: 906,958

[22] Filed: May 18, 1978

[30] Foreign Application Priority Data

May 28, 1977 [DE] Fed. Rep. of Germany ....... 2724332

[51] Int. Cl.² ............................................. F15B 21/04
[52] U.S. Cl. .......................................... 92/82; 92/187
[58] Field of Search ................. 92/187, 158, 159, 160, 92/82, 86

[56] References Cited

U.S. PATENT DOCUMENTS

| 1,137,111 | 4/1915 | Balough | 92/160 |
|---|---|---|---|
| 1,480,481 | 1/1924 | Wakefield | 92/158 |
| 3,003,837 | 10/1961 | Flame et al. | 92/158 |
| 3,783,747 | 1/1974 | Alford et al. | 92/160 |

FOREIGN PATENT DOCUMENTS 68717 8/1951 Netherlands ................ 92/158

*Primary Examiner*—Irwin C. Cohen
*Attorney, Agent, or Firm*—Wayne B. Easton

[57] ABSTRACT

The invention relates to a compressor of the type used in refrigeration systems. In these compressors the piston pin in the transversely extending piston bore is of lesser length than the diameter of the piston such that undesired chambers are formed at opposite ends of the pin. The stroke is normally of a length that the piston pin and these chambers intersect the lower edge of the cylinder. Gas trapped in these chambers expands rapidly with an undesired popping noise when fluid communication is established at the end of the down stroke between the chambers and the interior of the crankcase. Throttling passages are provided between these chambers and the interior of the crankcase to prevent pressure build-up in the chambers and the accompanying popping noise.

4 Claims, 6 Drawing Figures

PISTON-CYLINDER ARRANGEMENT FOR A COMPRESSOR

The invention relates to a piston-cylinder arrangement for a compressor, wherein a piston pin passes through holes in opposed piston walls, depressions remain at the piston periphery in the vicinity of the holes, and the cylinder surrounds the piston circumferentially over its entire length.

Such piston-cylinder arrangements are generally conventional. The depressions at the ends of the holes are formed in that the piston pin must have a somewhat shorter length than that corresponding to the piston diameter and the ends of the holes are generally bevelled to avoid sharp edges. The stroke of the piston is such that the piston will remain in the cylinder practically completely even at the lower dead centre. Such compressors have for example proved useful for refrigerators. They also have the characteristic of running quietly.

The invention is based on the problem of providing a piston-cylinder arrangement of the aforementioned kind which, for a given piston displacement and a given length of cylinder, permits a higher efficiency to be obtained whilst maintaining the advantages such as quiet running.

This problem is solved according to the invention in that the piston stroke is such that the depressions at least partially leave the cylinder at the lower dead centre, and that leakage passages provided in the piston and/or piston pin connect the depressions to the space at the back of the piston. For a given piston displacement, the increased piston stroke leads to a reduction in the piston diameter and thus to a smaller piston circumference. The leakage losses are thereby reduced in proportion to the reduction in diameter and the efficiency is correspondingly increased. If, however, only the piston stroke is increased, sounds are created which resemble explosions and are very annoying, particularly in the case of refrigerant compressors for household purposes.

It has been found that these explosion-like noises arise because pressurised leakage gas expands in the depressions with a bang when the depressions leave the cylinder. However, if the depressions are connected to the space at the back of the piston by way of leakage passages, no pressurised gas bubble can be formed in the depressions. The increased leakage losses occasioned by the leakage passages are minimal and in any case many times less than the reduction in leakage losses obtained by reducing the piston diameter. This is because the leakage passages are effective only at the rear end of the piston, are confined to the peripheral portion of the depressions and can in any case be designed as throttle passages. To prevent the explosive sounds it is not necessary to keep the depressions at the same basic pressure level as the space at the back of the piston; it is sufficient if the pressure in the depressions is reduced by an appropriate extent.

In a first embodiment, the leakage passages are formed by two grooves which extend at the piston periphery from the depressions to the rear edge of the piston. These grooves can be very easily made. They also have the advantage that, if they are in the form of throttle passages, they have a throttling resistance which decreases as the piston leaves the cylinder and consequently the desired pressure drop in the depression occurs only just before the depression leaves the cylinder, whereby the additional leakage losses can be kept extremely low.

In another embodiment, the leakage passages are formed by two grooves which extend along the holes from the piston periphery to the interior of the piston. These grooves can also be very easily made. They are desirably disposed at the rear part of the holes where the forces to be transmitted from the piston pin to the piston are small.

In a third alternative, the leakage passages are formed by the cavity of a tubular piston pin and by a single groove which extends at the piston periphery from one depression to the rear edge of the piston. In this case only a single groove needs to be provided at the piston periphery.

The piston stroke is preferably substantially equal to the piston diameter, a stroke of 80 to 120% of the piston diameter being recommended. This results in a very good improvement in efficiency without requiring the cylinder to be extended axially.

The invention will hereinafter be described in more detail with reference to several embodiments shown in the drawing, wherein.

Figure 1:
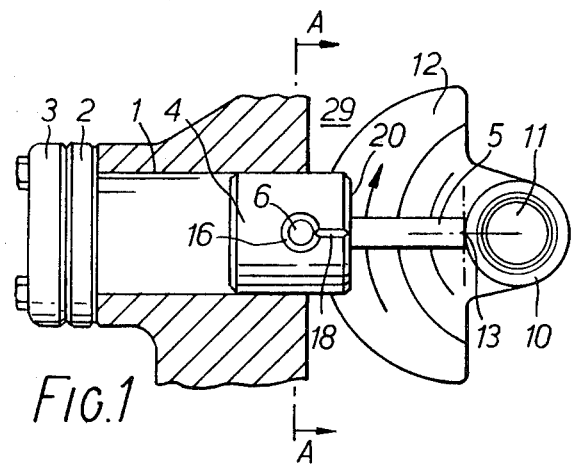
FIG. 1 is a part-section of a piston-cylinder arrangement according to the invention.
Figure 2:
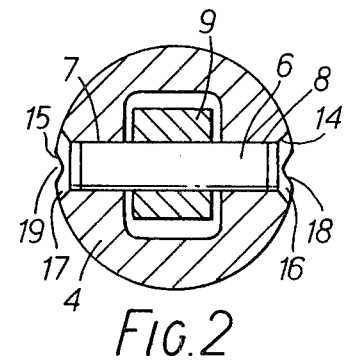
FIG. 2 is a section through the piston on the line A—A in FIG. 1.

A piston 4 is reciprocated by a connecting rod 5 in a cylinder 1 which is covered at the end by a valve plate 2 and a cylinder head 3. The connection is effected by way of a piston pin 6 passed through two holes 7 and 8 in opposed piston walls. The connecting rod 5 has a bearing 9 which engages around the piston pin 6 and a bearing 10 which engages around a piston pin 11. The latter is part of a motor shaft which is provided with a balancing weight 12 and rotates about the axis 13.

Since the piston pin 6 terminates within the diameter of the piston 4 and enlargements 14 and 15 are provided at the ends of the holes 7 and 8, depressions 16 and 17 are formed. As shown in FIG. 1, the piston stroke is such that these depressions leave the cylinder at the lower dead centre and thus communicate with the space 29 behind the cylinder. At a given cylinder length and a given piston displacement, this large piston stroke permits the piston diameter to be reduced. In the present example, the piston stroke is substantially equal to the piston diameter.

Leakage passages 18 and 19 having a throttling effect lead from the two depressions 16 and 17 along the piston periphery to the rear edge 20 of the piston. By reason of the gas leaking along the piston periphery, no compressed gas cushion can therefore be formed in the depressions 16 and 17 that might expand with an explosion when it comes into communication with the space 18 behind the cylinder. Instead, the leakage passages 18 and 19 having a throttling effect ensure that this pressure is already reduced before the depressions 16 and 17 leave the cylinder 1. It will be evident that the throttling resistance of these passages decreases all the more as the piston comes closer to the lower dead centre.

Figure 3:
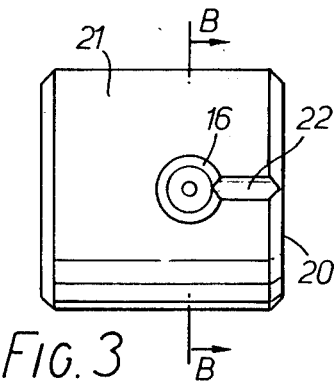
FIG. 3 is an elevation of a modified piston.
Figure 4:
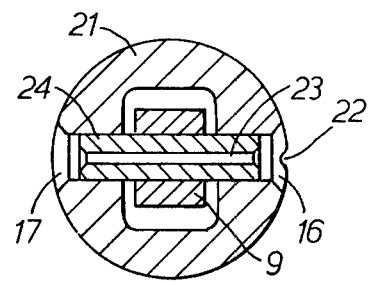
FIG. 4 is a section on the line B—B in FIG. 3.

A second example is shown in FIGS. 3 and 4. The piston 21 in this case has only one throttling leakage passage which is led from the depression 16 to the rear edge 20 of the piston at the piston circumference. The other depression 17 communicates with the depression 16 by way of the cavity 23 of a tubular piston pin 24. In this way a pressure build-up is again avoided in both depressions 16 and 17.

Figure 5:
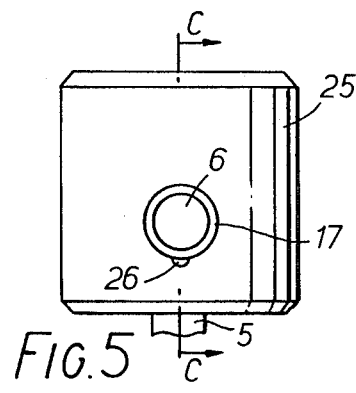
FIG. 5 shows a third embodiment of a piston according to the invention.
Figure 6:
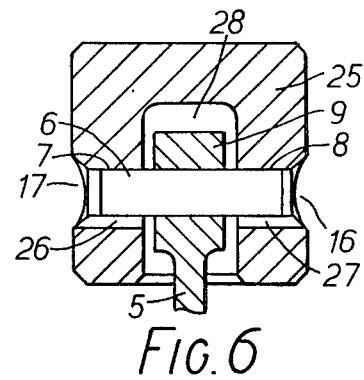
FIG. 6 is a section on the line C—C in FIG. 5.

In the embodiment of FIGS. 5 and 6, a piston 25 has leakage passages 26 and 27 at the back of the two holes 7 and 8 and they extend from the depressions 17 and 16 at the piston circumference to the interior 28 of the piston.

What is claimed is:

1. A compressor assembly, comprising, a casing forming a cylinder and a crankcase, a piston member having no sealing ring, said piston being reciprocally mounted in said cylinder and having a transversely extending bore, a pin member in said bore having a length which is shorter than the diameter of said cylinder so as to define recesses at opposite ends thereof, a crankshaft in said crankcase, a crank extending between and connected at opposite ends thereof to said pin member and to said crankshaft, said piston member having a stroke relative to said cylinder so that said recesses extend beyond the lower edge of said cylinder when said piston member is at the bottom of its stroke, throttle passage means in at least one of said members providing fluid communication between said recesses and the interior of said crankcase when said recesses are entirely above the lower edge of said cylinder.

2. A compressor assembly according to claim 1 wherein said passage means is in said piston member.

3. A compressor assembly according to claim 2 wherein said passage means is partially in said pin member.

4. A compressor assembly according to claim 1 wherein said passage means are grooves in the periphery of said piston member extending from said recesses to said lower edge of said cylinder.

* * * * *